United States Patent [19]

Igari et al.

[11] 4,401,566
[45] Aug. 30, 1983

[54] BODY FLUID-FILTERING DEVICE

[75] Inventors: Akira Igari, Tokyo; Tsutomu Murakami, Zama, both of Japan

[73] Assignee: Terumo Corporation, Tokyo, Japan

[21] Appl. No.: 283,518

[22] Filed: Jul. 18, 1981

[30] Foreign Application Priority Data

Jul. 23, 1980 [JP] Japan ................................ 55/100663
Jul. 23, 1980 [JP] Japan ................................ 55/100664

[51] Int. Cl.³ ............................................ B01D 31/00
[52] U.S. Cl. .................................. 210/351; 210/433.2; 210/927
[58] Field of Search ................ 210/DIG. 13, 314, 351, 210/352, 346, 433.2, 386, 927

[56] References Cited

U.S. PATENT DOCUMENTS 2,666,529  1/1954  Landmer ............................ 210/352
2,686,154  8/1954  MacNeill ........................ 210/351 X
2,850,168  9/1958  Nostrand .................... 210/DIG. 13
4,234,428 11/1980  Schnell .......................... 210/314 X

FOREIGN PATENT DOCUMENTS 1555389 11/1979 United Kingdom ............. 210/433.2

Primary Examiner—Frank A. Spear, Jr.
Attorney, Agent, or Firm—Frishauf, Holtz, Goodman & Woodward

[57] ABSTRACT

A body fluid-filtering device includes a housing provided with a body fluid inlet, a filtrate outlet and a filtration residue outlet, and a filtering means disposed in the housing and including first and second filtering elements alternately superposed on each other with a space therebetween. The first and second filtering elements are each formed of a meshed core material and filtering membranes which cover both sides of the core. The core material of the first filtering element has openings of 700 to 1300 microns, and the core material of the second filtering element has openings of 300 microns or less.

8 Claims, 9 Drawing Figures

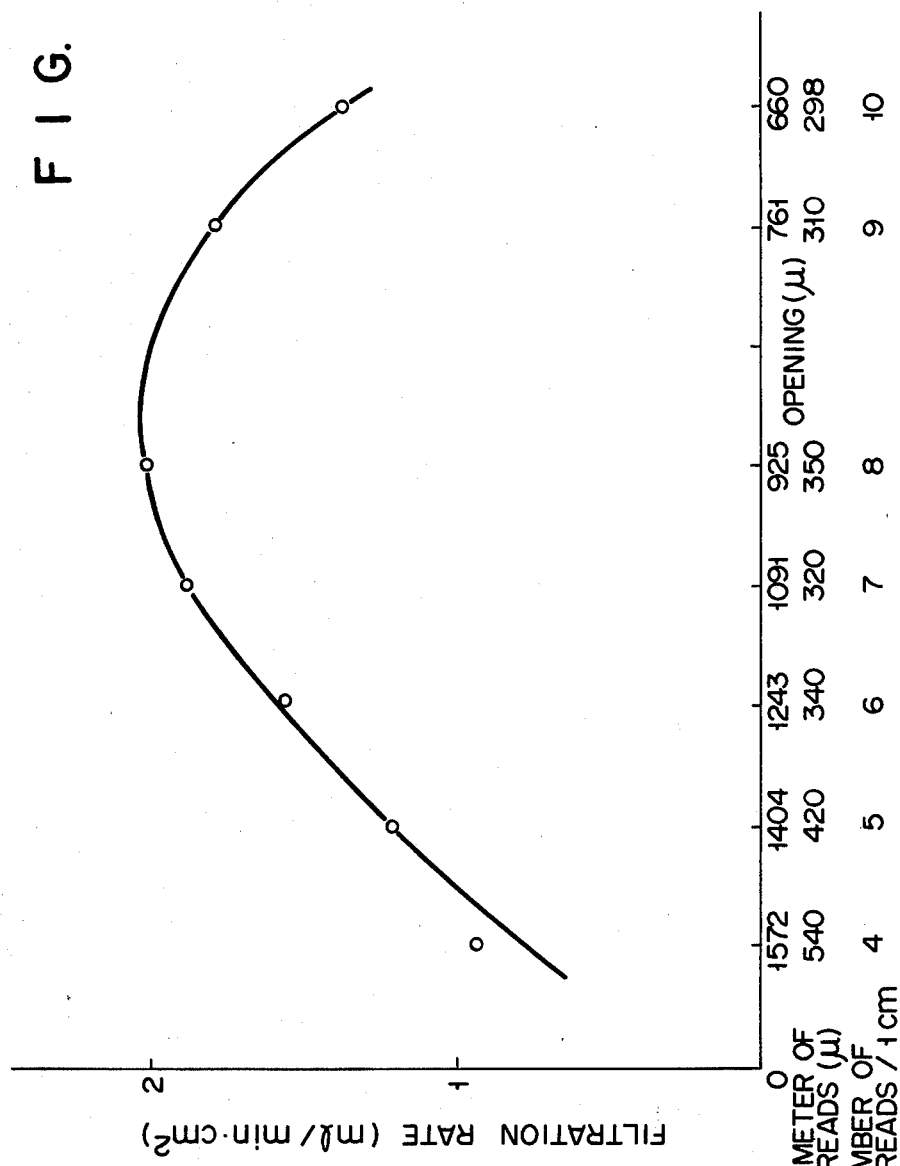

BODY FLUID-FILTERING DEVICE

BACKGROUND OF THE INVENTION

1. Field of the Invention

This invention relates to a body fluid-filtering device including, for example, a hemofiltration type artificial kidney for the effective treatment of a patient suffering from renal insufficiency or the like.

2. Description of the Prior Art

In recent years, medical treatment by blood filtration has been used for patients suffering from, for example, renal insufficiency which is difficult to treat by dialysis. Therefore, strong demand is made for the development of a hemofiltration type artificial kidney. For medical treatment by blood filtration, the blood should be filtered and the filtrate should be discharged in a volume of 20 to 25 1/5 hr, and consequently an artificial kidney is required to have a filtration rate of 66–85 ml/min.

The conventional hemofiltration type artificial kidney includes the hollow fiber type provided with a plurality of fibers, and the plate type provided with a plurality of superposed flat filtering membranes. However, both types present difficulties in respect of filtering capacity, size and manufacturing cost.

The filtering capacity of the above-mentioned conventional type of artificial kidney largely depends on, for example, not only the material of a filtering membrane and the blood flow rate, but also the thickness of a blood flow passage extending through superposed filtering membranes. In this case, blood filtration can be effected at a higher rate by reducing the thickness of the blood flow passage. However, the conventional hollow fiber type artificial kidney has the drawbacks that a limitation is imposed on the reduction of the inner diameter of a fiber from the standpoint of manufacture; the inner diameter of the fiber can be reduced only to about 200 microns at most and therefore blood filtration, for example, fails to be effected at a desired rate; the wall of a filtering membrane is sheared at a low rate; the filtration rate decreases with time due to the deposition of, for example, protein on the filtering membrane; and a change with time is likely to occur in the cut-off molecular weight of components of a body fluid.

The conventional plate type artificial kidney has the drawbacks that a spacing between the plate type filtering membranes is defined by a plurality of separately arranged spacers, presenting difficulties in equalizing the thickness of an inter-membrane space (thickness of the passage) at various points, and reducing said thickness of an inter-membrane space. Thus, it is difficult to increase the filtration capacity in the artificial kidney of this type.

The conventional attempt to resolve the above-mentioned difficulties comprises using two body fluid-filtering devices, whether of the hollow fiber type or of the plate type, or broadening the area of a filtering membrane. However, these attempts are accompanied with the drawbacks that the filtering device itself is unavoidably enlarged, resulting in high manufacturing cost.

In this connection, reference is made to British Pat. No. 1,555,389 which discloses an ultrafilter. This ultrafilter is constructed by superposing a plurality of filtering elements, each of which comprises a substrate prepared from, for example, meshed woven fabric and covered with a filtering medium at least on one side, and placing the superposed filtering elements in a chamber. With the above-mentioned ultrafilter, a body fluid is filtered while passing through a plurality of superposed filtering elements by utilizing the pressure difference.

The superposed filtering elements help to reduce the size of a filtering device as a whole. However, the filtering apparatus of the British patent was still accompanied with the drawbacks that it is difficult to reduce the thickness of an inter-membrane space, and proteins contained in blood tend to adhere to the membrane because of a slow shearing rate of blood against the membrane wall, resulting in insufficient filtering capacity, and noticeable variations in the filtration rate. Further, blood tends to leak into the filtrate in this filtering device.

SUMMARY OF THE INVENTION

It is accordingly the object of this invention to provide a body fluid-filtering device which can carry out the filtration of a body fluid at a high rate with little variation.

To attain the above-mentioned object, this invention provides a body fluid-filtering device which comprises:

a housing provided with a body fluid inlet, filtrate outlet, and filtration residue outlet; and filtering means disposed in the housing and including first and second filtering elements alternately superposed on each other with a space therebetween. The first filtering element is formed of a meshed core material having openings of 700 to 1300 microns and filtering membranes covering both sides of said core material. The second filtering element is formed of a meshed core material having openings of 300 microns or less and filtering membranes covering both sides of said core material.

A body fluid entering the filtering device at the inlet of the housing is filtered by the filtering membranes of the first and second filtering elements, passing through the core materials thereof to the filtrate outlet of the housing. On the other hand, a filtration residue is conducted through a space defined between the filtering membranes of the first and second filtering elements to the outlet of the housing.

The present inventors have studied the filtering capacity of the filtering device of the aforementioned British patent. As a result, it has been found that the filtering capacity depends on the size of the openings of the core material of a filtering element, and that the openings of 700 to 1300 microns assures a maximum filtration rate.

The present inventors' further studies show that the reason why the filtering capacity of the filtering device of the previously described British patent was insufficient and further was accompanied with noticeable variations in the filtration rate was that the core materials and filtering membranes of the superposed filtering elements were respectively prepared from the same material and had the same size and dimensions; consequently the pitches of the roots and crests of each of the adjacent waveforms defined by said core materials and filtering membranes were identical; and where the roots and crests were respectively set opposite to each other, then a blood passage extending through a plurality of superposed filtering elements was increased in thickness.

This invention has been accomplished from the above-mentioned discovery, and is intended to provide a body fluid-filtering device, in which the first and second filtering elements are alternately superposed, thereby assuring a prominently high filtering capacity, without giving rise to noticeable variations in the filtration rate.

As used herein, the term "variation" is defined to mean the percentage deviation from the average filtration rate.

BRIEF DESCRIPTION OF THE DRAWINGS

FIG. 9 graphically indicates the relationship between the size of the openings of the meshed core material and the filtration rate.

DETAILED DESCRIPTION OF THE PREFERRED EMBODIMENTS

Figure 1:
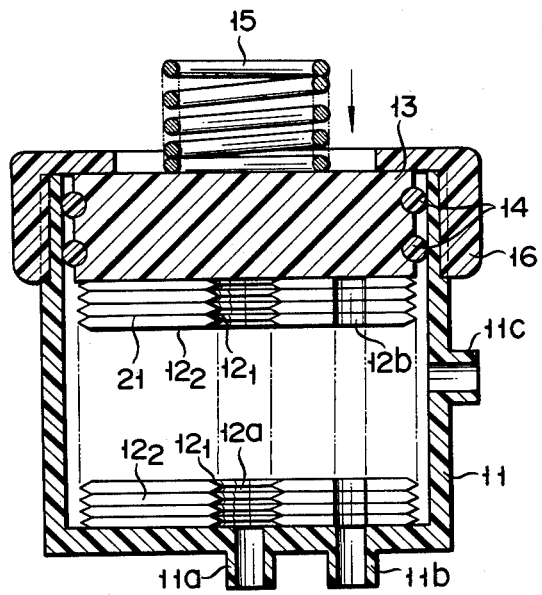
FIG. 1 is a schematic sectional view of an artificial kidney embodying this invention.

FIG. 1 is a sectional view of an artificial kidney embodying this invention. The artificial kidney is constructed by housing two different alternately superposed annular filtering elements $12_1$, $12_2$ in the form of a disc in a housing 11. The housing 11 is prepared from a synthetic resin such as polystyrene resin in a cylindrical form. An inlet 11a of a body fluid, for example blood, is provided at the center of the bottom of the cylindrical housing 11. An outlet 11b of a filtrate is formed in the peripheral edge portion of the bottom of the cylindrical housing 11. An outlet 11c of a filtration residue including, for example blood, is formed in the lateral wall of the cylindrical housing 11. A piston 13 is set inside of the upper open end portion of the housing 11. A plurality of silicone resin O rings 14 are fitted to the outer peripheral wall of said piston 13. These O rings 14 slide along the inner wall of the housing 11 in airtightness. An elastic compression coil spring 15 is mounted on the upper surface of the piston 13 to depress it downward. An adjustment ring 16 is fitted to the outer peripheral wall of the upper end portion of the housing 11 to restrict the upward movement of the piston 13.

Figure 2:
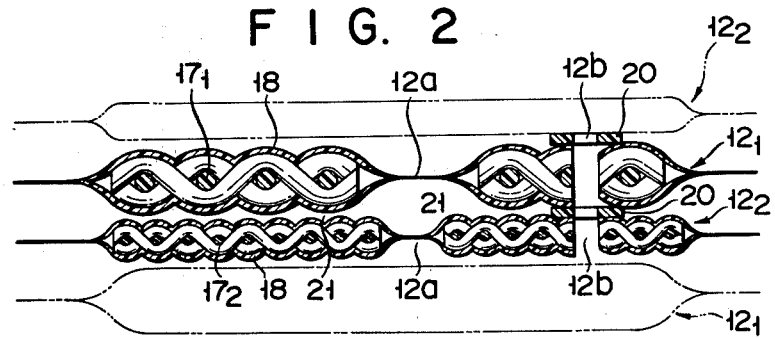
FIG. 2 is a sectional view of a filtering element.
Figure 6:
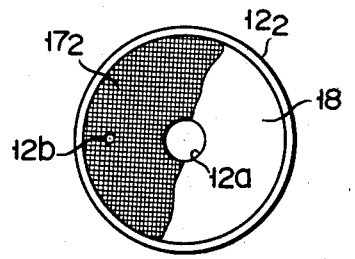
FIGS. 5 and 6 are fractional sectional views of two different filtering elements.
Figure 5:
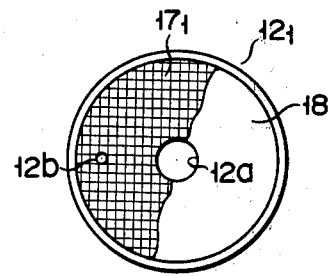

As illustrated in FIGS. 2 and 5, the first filtering disc $12_1$ is constructed by mounting a filtering membrane 18 on both sides of a meshed core material $17_1$. As indicated in FIGS. 2 and 6, the second filtering disc $12_2$ is constructed by similarly mounting a filtering membrane 18 on both sides of a meshed core $17_2$. The core materials $17_1$, $17_2$ are respectively constructed by knitting threads of, for example, polyester or polyethylene in the form of an annular disc. The meshed core material $17_1$ has openings of 700 to 1300 microns. If the opening of the core material $17_1$ has a smaller size (the term "size" is defined later) than 700 microns, then a sufficient filtration rate is not assured. If said opening has a larger size than 1300 microns, then a body fluid passage extending through the superposed filtering discs increases over a prescribed level, resulting in a failure to assure a required filtering rate from the standpoint of filtration theory and practice, and also giving rise to noticeable variations in the filtering rate. To provide a meshed core material having openings whose size falls in the above-mentioned range, it is preferred from the standpoint of manufacture to knit the threads having a diameter of 300 to 350 microns in such a manner that 7 to 9 threads are knit together per cm. If a larger number of threads than 9 are knit together per cm, then a sufficient filtration rate is not assured. If fewer than 7 threads are knit together per cm, then the aforesaid thickness of body fluid passage increases, failing to provide a required filtration rate and causing noticeable variations in the filtration rate.

Figure 4:
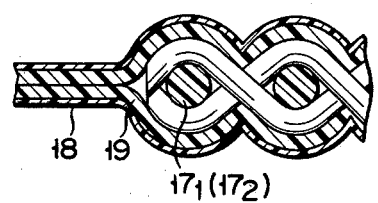
FIG. 4 is a fractional enlarged view of FIG. 2.

The meshed core material $17_2$ has openings whose size is chosen to be 300 microns or smaller. If the opening size increases over 300 microns, then the thickness of body fluid passage extending through the superposed filtering discs increases, making it impossible to assure a required filtration rate. In this case, the openings of the meshed core material $17_2$ are preferred to have a size falling within the range of particularly 100 to 300 microns from the standpoint of manufacture and also a proper filtration rate. To produce a meshed core material formed of openings whose size is chosen to fall within the range of 100 to 300 microns, it is preferred to knit threads having a diameter of 80 to 150 microns in such a manner that 22 to 61 threads are knit together per cm. If more threads than 61 are knit together per cm, then difficulties arise in the flow of a filtrate. Where fewer threads than said range are knit toghether per cm., then a required filtration rate fails to be assured. As used herein, the term "opening size" is defined as follows:

$$\text{Opening} = \sqrt{ab}$$

where:
a = a longitudinal length of a rectangular or square space defined by a plurality of threads
b = a crosswise length of the space The filtering membrane 18 is prepared from a material which mainly consists of aromatic polyamide, for example, nylon and can filter a body fluid whose cut-off molecular weight ranges between 20,000 and 65,000. The filtering membrane 18 is formed with a thickness of 30 to 300 microns, for example, by the phase separation or extraction method. In this case, a filtering membrane 18 having a smaller thickness than 30 microns has a low mechanical strength. A filtering membrane 18 having a greater thickness than 300 microns decreases in the filtering capacity. As seen from FIG. 4, the filtering membrane 18 has its mechanical strength increased by being lined with a support member 19 formed of nonwoven fabric prepared from, for example, polyethylene or polypropylene.

Figure 3:
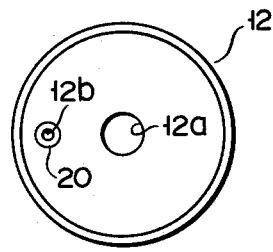
FIG. 3 is a plan view of the filtering element.

With the filtering discs $12_1$, $12_2$ constructed as described above, a body fluid inlet 12a is formed at the center, and a filtrate outlet 12b is provided in the peripheral edge portion (FIGS. 1 and 3). A support member 19 is bonded to the peripheral edge of the filtering membrane 18 and the peripheral edge of the body fluid inlet 12a by thermal or ultrasonic fusion or by means of, for example, an adhesive. Bonding by thermal fusion is effected at a temperature of 148° to 152° C. with a pressure of 0.3 to 0.4 kg/cm². A ring-shaped seal member 20 is bonded to the peripheral edge of the filtrate outlet 12b. The seal member 20 is formed of a tape whose base material is coated on both sides with acrylic resin, or a tape whose base material is coated on both sides with synthetic rubber-based hot melt. The coating is generally effected with a thickness of about 150 to 200 microns. Where the seal member 20 is bonded to the peripheral edge of the filtrate outlet 12b, then a space defined between the filtrate okutlet 12b of the filtering disc 12$_1$ and that of the adjacent filtering disc 12$_2$ is completely shut off from the inter-membrane space 21. Therefore, a body fluid filtered by the filtering discs 12$_1$, 12$_2$ is continuously conducted to and discharged from the outlet 11b without blood entering into it.

Figure 7:
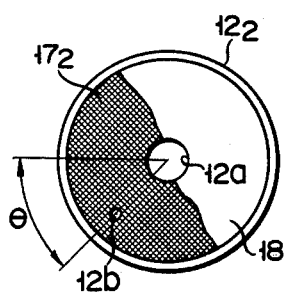
FIG. 7 shows fractional sectional view of a second filtering element according to one embodiment of the invention.

As previously mentioned, the openings of the meshed core material of the second filtering element have an opening size of 300 microns or less. Where a filtering membrane with a thickness of 30 to 300 microns is superposed on said meshed core material, then the surface of the superposed filtering membrane seems to be flat as macroscopically viewed. As microscopically viewed, however, the superposed filtering membrane has an undulated surface, as shown in FIG. 2, extending along the similarly undulated surface of the meshed core material. Where, therefore, the first and second filtering elements are superposed on each other in such a manner that the lengthwise or crosswise extending threads of the core materials thereof are aligned in the same direction, then a body fluid may make a free or obstructed flow depending on the above-mentioned thread arrangement. A short straightforward blood passage runs along the core-constituting threads, allowing for the easy flow of a large amount of blood. In a direction defining an angle of 45° with the core threads the blood obstructedly runs in zigzags along a long course. In such case, it is sometimes impossible to assure a prescribed filtration rate. Therefore, with a body fluid-filtering device or artificial kidney embodying this invention, the first and second filtering elements are superposed on each other in such a manner that the core threads of said filtering discs intersect each other at an angle $\theta$ of 30° to 60°, particularly 45° as shown in FIG. 7. This arrangement has the advantage that a body fluid runs at the uniform rate along any course toward the peripheries of the first and second annular superposed filtering discs, thereby assuring the prescribed filtering rate and reducing variations therein. When the angle $\theta$ is smaller than 30° or larger than 60° a desired filtration rate cannot be obtained and noticeable variations in a filtration rate takes place.

Figure 8:
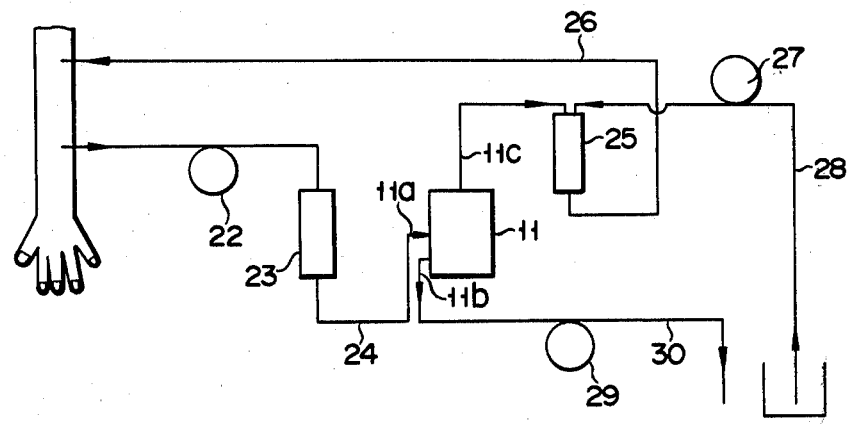
FIG. 8 shows a circuit arrangement for effecting blood circulation which is fitted with an artificial kidney embodying this invention.

The artificial kidney of this invention arranged as described above is used with a blood-filtering circuit shown in FIG. 8. With this circuit, a blood inlet 11a is fitted with a blood inlet tube 24 provided with a blood pump 22 and artery chamber 23. A filtration residue outlet 11c is fitted with a blood outlet tube 26 provided with a vein chamber 25. A pump 27 sends forth, for example, a physiological electrolyte solution as a supplement to the deficiency of blood component which is caused by filtration (hereinafter referred to "a substitution fluid"). The vein chamber 25 is fitted with a substitution fluid feeder 28 provided with a substitution fluid pump 27. A filtrate outlet 11b is fitted with a filtrate discharge tube 30 provided with a negative pressure pump 29.

With the blood-filtering circuit of FIG. 8, the blood of a human body runs into the housing 11 through the blood inlet tube 24 and body fluid inlet 11a, and then passes along a blood passage 21 extending between the alternately superposed first and second filtering discs 12$_1$, 12$_2$. A filtrate is separated by means of the filtering membranes 18. After a plasma component separated from the blood is released, the remainder of the blood containing blood corpuscles is brought back into the human body together with the substitution fluid through a filtration residue outlet 11c and filtration residue discharge tube 26. A filtrate separated by the filtering membranes 18 of the alternately superposed first and second filtering discs 12$_1$, 12$_2$ runs through a space defined between the core materials 17$_1$, 17$_2$ of said first and second filtering discs 12$_1$, 12$_2$. Fluid streams filtered by these filtering discs 12$_1$, 12$_2$ are collected at the filtrate outlet 11b, and discharged to the outside through the filtrate discharge tube 30.

The body fluid-filtering device of this invention is constructed, as described above, by alternately superposing the first filtering element 12$_1$ provided with a meshed core material having openings whose size ranges between 700 and 1300 microns and the second filtering element 12$_2$ provided with a meshed core material having openings whose size is 300 microns or less. This arrangement assures a prescribed blood passage 21 and a required filtration rate without variations.

This advantage can be theoretically explained as follows. Where a plurality of superposed filtering elements of one type, for example, the first filtering elements 12$_1$ are placed in a housing, a maximum filtration rate is assured, if the meshed core material of said filtering elements 12$_1$ has openings whose size ranges between 700 and 1,300 microns as shown in FIG. 9. In this case, however, the roots and crests of the waveforms defined by said superposed meshed filtering element 12$_1$ are respectively set opposite to each other, leading to the elongation of the thickness of a blood passage extending through said superposed filtering elements 12$_1$.

In contrast where a plurality of the second filtering elements 12$_2$ alone are superposed whose core material has openings having a size of 300 microns or less, then a pitch between the respective roots and crests of the waveforms defined by said superposed filtering elements 12$_2$ is entirely different from that which is observed in the superposed filtering elements 12$_1$. Where, therefore, the first and second meshed filtering elements 12$_1$, 12$_2$ are alternately superposed on each other, then the roots and crests of the waveforms defined by said first and second filtering elements 12$_1$, 12$_2$ are set opposite to each other at far fewer points, thereby prominently reducing the thickness of the blood passage extending through said alternately superposed first and second filtering elements 12$_1$, 12$_2$ and assuring a desired blood passage and required filtration rate with little variation.

The above-mentioned fact was confirmed by the undermentioned experiments.

EXAMPLE 1

The specification of an experimental body fluid-filtering device embodying this invention runs as follows.
Filtering membrane:
Material: Aromatic polyamide membrane lined with nonwoven polyethylene fabric
Outer diameter: 100 mm
Inner diameter: 10 mm
Surface area: 146 cm$^2$
Cut-off molecular weight allowing for 95% filtration: 50,000 (when blood is used)
Thickness: 210 microns
Core material of the first filtering element:
Construction: by knitting together 7 to 9 polyethylene threads per cm which have a diameter of 300 to 350 microns, in such a manner that the size of the openings defined by said knit threads indicates 700 to 1300 microns Core material of the second filtering element:

Construction: by knitting together 22 to 66 polyethylene threads per cm which have a diameter of 80 to 150 microns, in such a manner that the size of the openings defined by said knit threads indicates 150 to 280 microns Bonding of filtering membranes at peripheral ends: by heat seal Total area of a filtering disc: 0.4 m²

Method of experiment

A fresh bovine blood was diluted by the previously provided blood plasma to let the hematocrit (Ht) value be set at 20%, and the total protein quantity (TP) be set at 7.0 g/dl. Measurement was made of the rate at which the body fluid-filtering device of this invention, having the above-mentioned specification, filtered said diluted bovine blood by changing the conditions of the experiment such as the size of the openings of the core material, the area of the filtering element and the flow rate of the bovine blood, the results being set forth in Table 1 below. Table 1 also indicates the results of determining the filtering capacity of a combination of two control filtering elements provided for comparison with the example of this invention. The experimental conditions of said controls were changed in the same manner as those of the example of the invention.

falls within the range prescribed by this invention assures a high filtration rate with little variation.

The body fluid-filtering device of this invention whose filtering membrane is prepared from aromatic polyamide has a prominent filtering capacity, as confirmed by the following example.

Example 2

Measurement was made of a cut-off molecular weight which was filtered by a first filtering element used in Example 1. Index materials tested were bovine seriumalbumin (concentrated at 3.0 g/dl), cytochrome-c, inulin, vitamin $B_{12}$ and BUN. When dissolved in a physiological saline solution, these index materials indicated the following rejection rate:

|  | % |
| --- | --- |
| Bovine serum - albumin | 96 to 97 |
| Cytochrome-c | 15 to 18 |
| Inulin | 5 to 7 |
| Vitamin $B_{12}$ | 0 to 2 |
| BUN | 0 |

Therefore, a cut-off molecular weight filterable by the above-mentioned first filtering element was found to be 50,000 to 60,000.

With a fresh bovine blood whose hematocrit value was 25% and whose total protein quantity was 3.5 g/dl,

TABLE 1

| Sample | Area of filtering element (m²) | Flow rate of bovine blood (ml/min) | Pressure drop (mm Hg) | Opening size of the core material (microns) | Core thread diameter (microns) | Number of core threads (per cm) | Average of 5 filtration rates (ml/min) | Variation in the filtration rate (%) |
| --- | --- | --- | --- | --- | --- | --- | --- | --- |
| Example | 0.4 | 200 | 250 | In 1st filtering element | | | 70 | ±3 |
| | | | | 925 | 345 | 8 | | |
| | | | | In 2nd filtering element | | | | |
| | | | | 158 | 86 | 47 | | |
| A combination of two control filtering element, the first one of which has its opening size deviated from the prescribed level of the invention | 0.4 | 200 | 250 | In 1st filtering element | | | 59 | ±10 |
| | | | | 1570 | 545 | 5 | | |
| | | | | In 2nd filtering element | | | | |
| | | | | 158 | 86 | 47 | | |
| A combination of two control filtering element, the second one of which has its opening size deviated from the prescribed level of the invention | 0.4 | 200 | 250 | In 1st filtering element | | | 62 | ±8 |
| | | | | 925 | 345 | 8 | | |
| | | | | In 2nd filtering element | | | | |
| | | | | 351 | 173 | 19 | | |
| A combination of two control filtering element, both of which have the opening sizes deviated from the prescribed level of the invention | 0.4 | 200 | 250 | In 1st filtering element | | | 53 | ±16 |
| | | | | 1570 | 545 | 5 | | |
| | | | | In 2nd filtering element | | | | |
| | | | | 351 | 173 | 19 | | |

The above Table 1 shows that a body fluid-filtering device whose core material has openings whose size the above-mentioned index materials showed the following rejection rate.

|  | % |
|---|---|
| Bovine serum - albumin | 98 to 100 |
| Cytochrome-c | 60 to 65 |
| Inulin | 30 to 35 |
| Vitamin $B_{12}$ | 2 to 5 |
| BUN | 0 |

Consequently, the first filtering element was found to filter a substance having a molecular weight of 50,000 to 60,000. The above-mentioned test showed that a filtering membrane prepared from aromatic polyamide could not substantially filter albumin having a molecular weight of 69,000, but could filter most of the substance having a smaller molecular weight than 69,000. In other words, said filtering membrane was found to be well adapted for blood filtration.

As seen from the foregoing description, this invention has the advantages that the filtering membranes are lined with a support member prepared from nonwoven fabric of polyethylene or polypropylene, can be sealed together easily and reliably and further machined with great ease. Further, a pressure applied to the filtering membrane is adjusted by a piston fitted with O-rings to reduce the thickness of a blood passage extending through a plurality of superposed filtering elements as much reduced as possible, thereby increasing blood shearing rate against the membrane wall to a maximum extent, elevating a filtration rate. Furthermore, a compression coil spring elastrically applies pressure to the piston, causing the blood passage to vary with the magnitude of the throbbing of blood streams entering the filtering device, thereby enabling said filtering device to be operated with great safety. Also, when the first and second filtering elements are constructed into a disc form, the pressure applied by the piston can be distributed uniformly thereon, though the present invention should not be limited to the disc form filtering elements.

What we claim is:

1. A body fluid-filtering device which comprises:
a housing provided with a body fluid inlet, a filtrate outlet and a filtration residue outlet; and
filtering means disposed in the housing and including first and second filtering elements alternately superposed on each other with a space therebetween, the first filtering element being formed of a first meshed core material having openings whose size ranges between 700 and 1300 microns and filtering membranes covering both sides of said first core material, the second filtering element being formed of a second meshed core material having openings whose size is 300 microns or less and filtering membranes covering both sides of said second core material, said space between said filtering elements being in communication with the filtration residue outlet of the housing, and said filtering means being provided with at least one filtrate outlet therein which is in communication with the filtrate outlet of the housing;
wherein a body fluid entering the filtering device at the body fluid inlet of the housing is filtered by the filtering membranes of the first and second filtering elements, passes through the first and second meshed core materials to the filtrate outlet of the housing, and the filtration residue is conducted through a space defined between the superposed filtering elements to the filtration residue outlet of the housing.

2. The body fluid-filtering device according to claim 1, wherein the core material of the first filtering element is constructed by knitting together 7 to 9 threads per cm which have a diameter ranging between 300 and 350 microns; and the core material of the second filtering element is constructed by knitting together 22 to 61 threads per cm which have a diameter ranging between 80 and 150 microns.

3. The body fluid-filtering device according to claim 1, wherein the filtering membranes comprise a material mainly consisting of aromatic polyamide with a thickness of 30 to 300 microns and in a state capable of filtering a substance having a molecular weight of 20,000 to 65,000, and which is lined with a support member made of nonwoven fabric of polyethylene or polypropylene.

4. The body fluid-filtering device according to claim 1, comprising means for depressing the filtering means, the depressing means including an elastic member coupled to a piston sliding through the housing in airtightness and applying pressure to the filtering means.

5. The body fluid-filtering device according to claim 1, wherein the first and second filtering elements are respectively made in the form of an annular disc.

6. The body fluid-filtering device according to any one of claims 1, 2, 3, 4 or 5, wherein said first and second filtering elements are superposed on each other such that the core threads of said filtering elements intersect each other at an angle of 30° to 60°.

7. The body fluid-filtering device according to any one of claims 1, 2, 3, 4 or 5, comprising a plurality of said first filtering elements and a plurality of said second filtering elements, said first and second filtering elements being alternately superposed on each other with said space between adjacent filtering elements.

8. The body fluid-filtering device according to claim 7, wherein said first and second filtering elements are superposed on each other such that the core threads of said filtering elements intersect each other at an angle of 30° to 60°.

* * * * *